US008662808B2

(12) United States Patent  (10) Patent No.: US 8,662,808 B2
Chen  (45) Date of Patent: Mar. 4, 2014

(54) ELASTIC NUT

(76) Inventor: Ching-Fu Chen, Luju Township, Taoyuan County (TW)

( * ) Notice: Subject to any disclaimer, the term of this patent is extended or adjusted under 35 U.S.C. 154(b) by 58 days.

(21) Appl. No.: 13/385,993

(22) Filed: Mar. 20, 2012

(65) Prior Publication Data

US 2012/0243959 A1  Sep. 27, 2012

(30) Foreign Application Priority Data

Mar. 24, 2011 (TW) .............................. 100110263 A

(51) Int. Cl.
*F16B 39/284* (2006.01)
(52) U.S. Cl.
USPC ........................................ 411/324; 411/937
(58) Field of Classification Search
USPC ................. 411/321, 323, 324, 333, 335, 360, 411/366.1, 431, 432, 506, 924.1, 937, 972
See application file for complete search history.

(56) References Cited

U.S. PATENT DOCUMENTS

| 1,464,591 | A | * | 8/1923 | Weichold, Jr. ................ 411/276 |
| 2,231,130 | A | * | 2/1941 | Lehre ............................ 411/285 |
| 2,271,267 | A | * | 1/1942 | Lehre ............................ 411/291 |
| 2,304,310 | A | * | 12/1942 | Luce ............................. 411/288 |
| 2,367,259 | A | * | 1/1945 | Beach ........................... 411/285 |
| 2,391,513 | A | * | 12/1945 | Randall ........................ 411/289 |
| 2,391,712 | A | * | 12/1945 | King et al. .................... 470/19 |
| 3,385,339 | A | * | 5/1968 | Dahl ............................. 411/288 |
| 3,971,614 | A | * | 7/1976 | Paoli et al. .................... 439/321 |
| 6,189,416 | B1 | * | 2/2001 | Groom ........................... 81/53.2 |

* cited by examiner

*Primary Examiner* — Roberta Delisle
(74) *Attorney, Agent, or Firm* — Morris Manning & Martin LLP; Tim Tingkang Xia, Esq.

(57) ABSTRACT

The invention provides a type of elastic nut, primary comprising first and second compression slots allowing for compression and connecting strips at the bottom of the retaining nut, with the connecting strips in alternate positions, so that when the retaining nut is used to hold a plug in place on the bolt, and further torque is applied to the retaining nut, the nut is held in place on top of the plug with elastic force, effectively holding the plug in place more tightly.

3 Claims, 4 Drawing Sheets

ELASTIC NUT

BACKGROUND OF THE INVENTION

1. Field of the Invention

This invention relates to an elastic nut, specifically one that more easily clamps objects between the nut and the top of a bolt, thereby providing improved functionality and convenience.

2. Description of the Prior Art

The currently commonplace retaining nut that screws onto and locks a bolt in place is often used with a C-shaped elastic washer placed in between the two in order to hold the bolt place, the washer adding elastic force to the occlusion of the nut; the need for the addition of an elastic washer causes some inconvenience during use.

SUMMARY OF THE INVENTION

The primary objective of this invention is to provide an elastic nut that is easier and more convenient to screw in place.

Distinctive features of the invention: primarily the screw threads on the inside of the main body of the retaining nut, the turning surface on the outside of the main body, the faying surface on the bottom of the main body of the nut, and, on the flange that extends below the turning surface, first and second compression slots and connecting strips, with the upper and lower connecting strips being in alternate positions.

BRIEF DESCRIPTION OF DRAWINGS

This invention is better understood by referring to the accompanying drawings, wherein.

DETAILED DESCRIPTION OF THE PREFERRED EMBODIMENT

Figure 1:
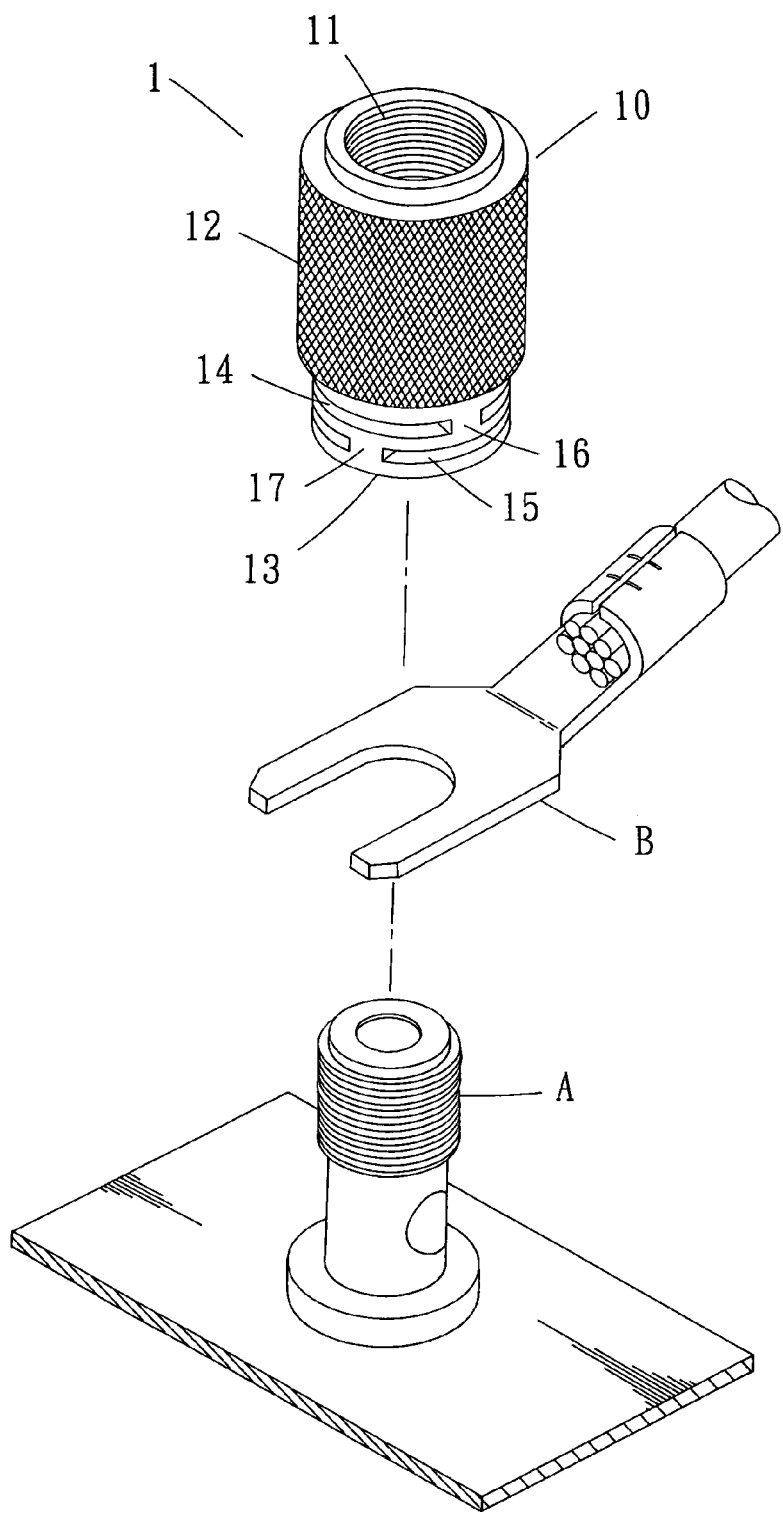
FIG. 1 is an exploded perspective view of the first preferred embodiment of the present invention.
Figure 2:
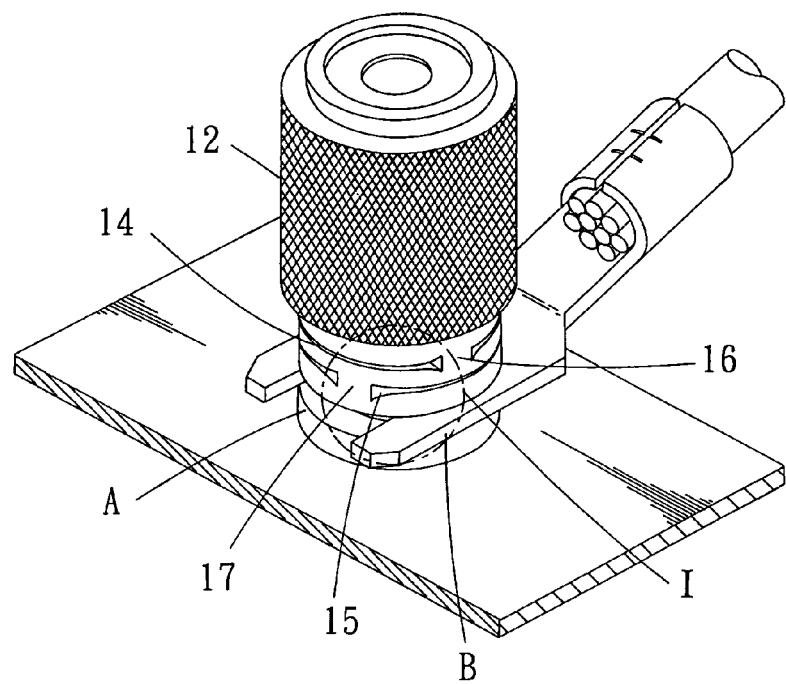
FIG. 2 is a perspective view of the first preferred embodiment of the present invention.
Figure 3:
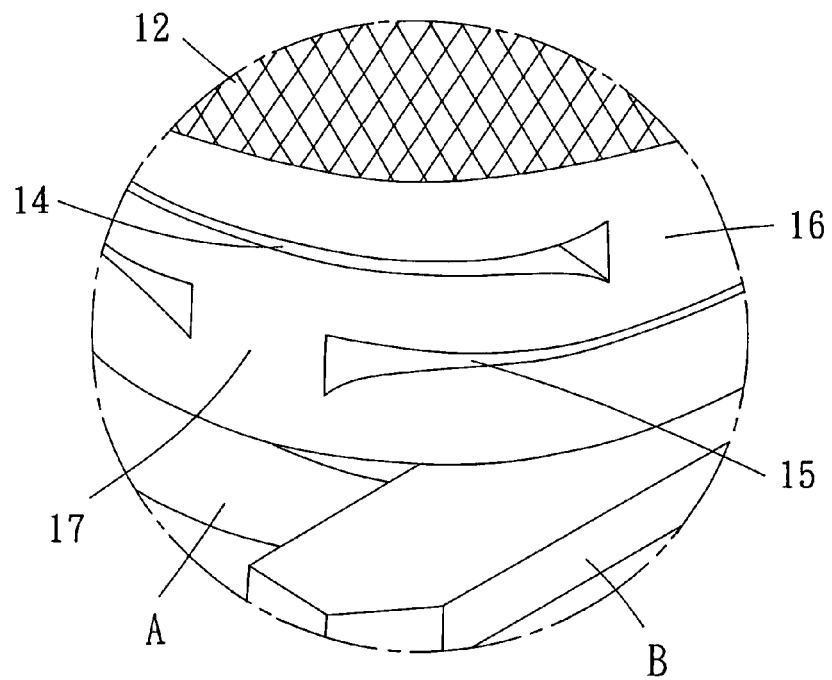
FIG. 3 is a magnified view of the mark (I) in FIG. 2.

A first preferred embodiment of an elastic nut in the present invention, as shown in FIGS. 1 to 3.

The retaining nut 1 primarily comprises a cylindrical main body 10, the inside of which is fitted with screw threads 11, and the outer surface of which has a knurled turning surface 12; the bottom part of the main body 10 has a faying surface 13; on the flange that extends below the turning surface 12 are the first and second compression slots 14, 15 which alternate with connecting strips 16, 17 the staggered configuration producing independent elastic force.

In using, the retaining nut 1 is turned to clamp the plug (B) to the desired bolt (A); after the retaining nut 1 has been tightened to touch the surface of the plug (B), further external force is applied to turn the retaining nut 1, at which time the faying surface 13 at the bottom of the main body 10 of the retaining nut 1 pushes against the plug (B), with the pressure causing the first compression slot 14 or second compression slot 15 to be elastically compressed, which thereby causes the screw threads 11 inside the retaining nut 1 to be pressed against the screw threads on the bolt (A) with greater elastic force.

Figure 4:
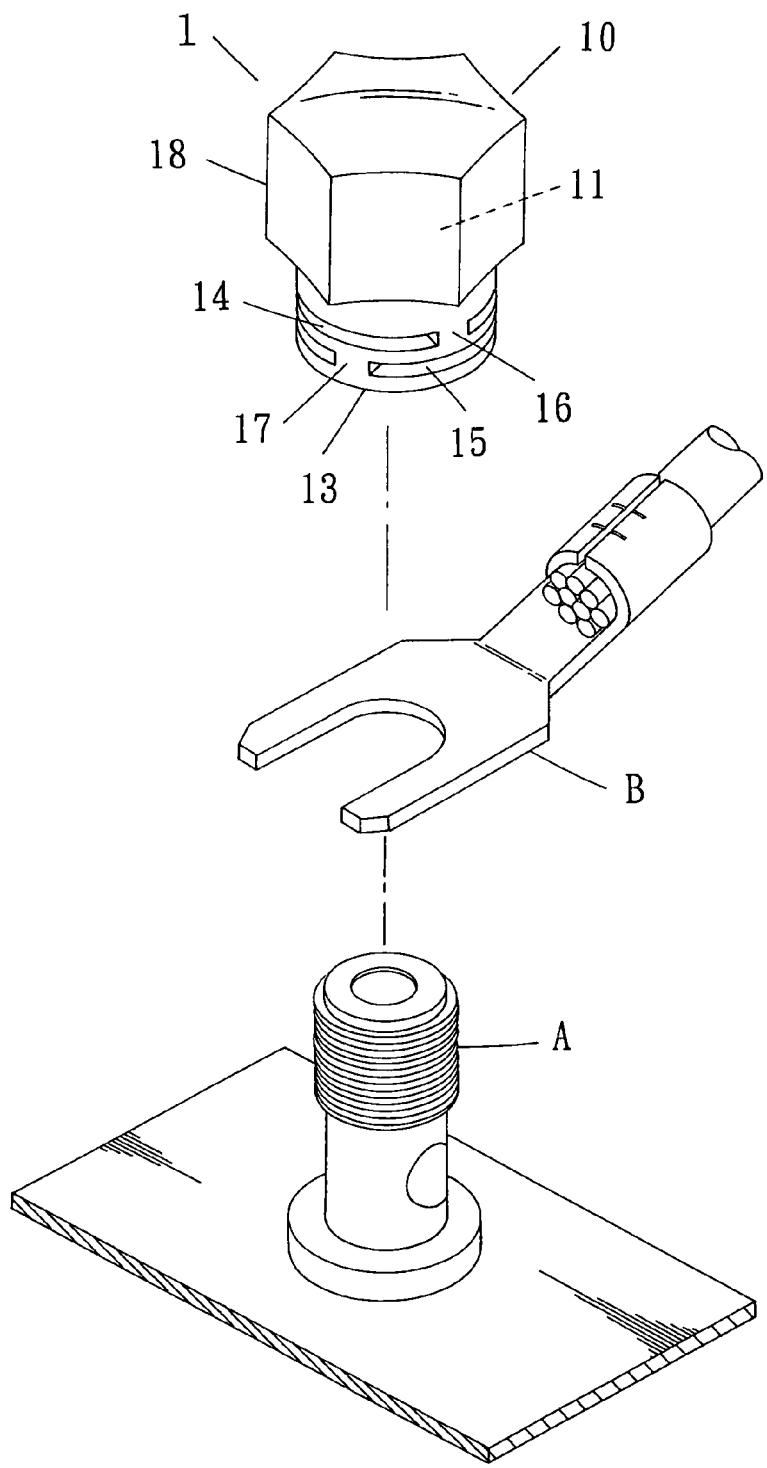
FIG. 4 is an exploded perspective view of the second preferred embodiment of the present invention.
Figure 5:
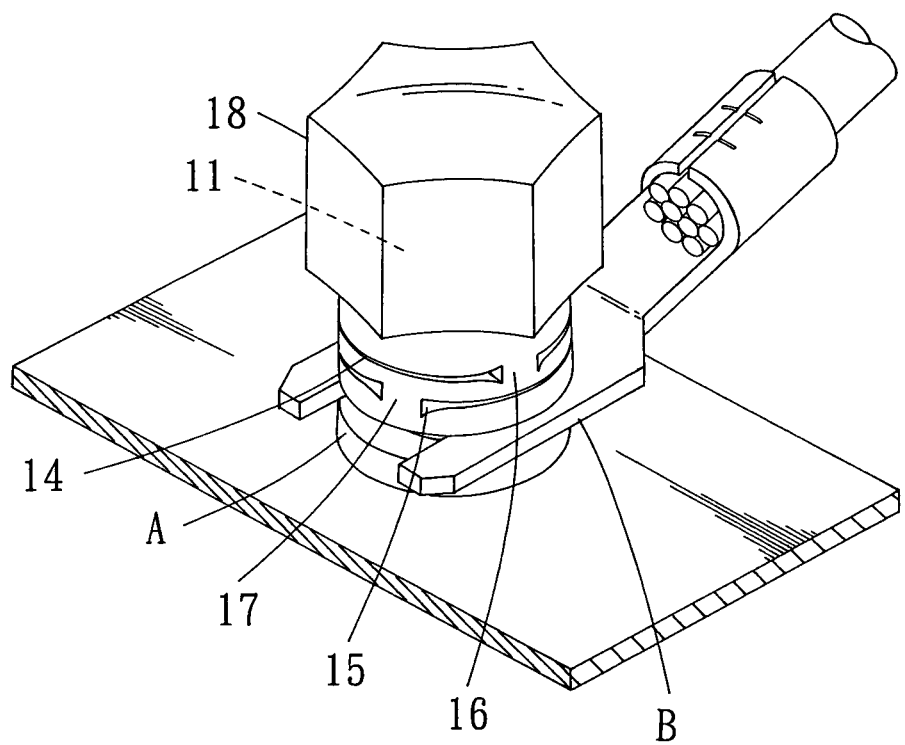
FIG. 5 is a perspective view of second preferred embodiment of the present invention.

A second preferred embodiment of an elastic nut in the present invention, as shown in FIGS. 4 to 5.

The retaining nut 1 primary comprises a main body 10, with screw threads 11 inside, a hexagonal turning surface 18, and a faying surface 13 on the bottom, between which are the first and second compression slots 14, 15 and connecting strips 16, 17 in an alternating arrangement, just below the hexagonal turning surface 18. And the alternating design of the first and second compression slots 14, 15 to produce independent elastic force. The hexagonal turning surface 18 is the hexagonal design.

In using, the retaining nut 1 is turned to clamp the plug (B) to the desired bolt (A); after the retaining nut 1 has been tightened to touch the surface of the plug (B), further external force is applied to turn the retaining nut 1, at which time the faying surface 13 at the bottom of the main body 10 of the retaining nut 1 pushes against the plug (B), with the pressure causing the first compression slot 14 or second compression slot 15 to be elastically compressed, which thereby causes the screw threads 11 inside the retaining nut 1 to be pressed against the screw threads on the bolt (A) with greater elastic force.

The invention has the following advantages as can be seen from the foresaid description.

1. The invention can effectively screw the nut to the bolt more tightly.

2. As the invention has the addition of elastic compression slots, it can effectively overcome the problem of the deformation of screw threads produced by the tightening of the nut.

3. The invention can more effectively prevent the plug (B) clamped in place from coming loose or sliding out.

4. The lower part of the retaining nut 1 has first and second compression slots 14, 15 in alternating positions, with the resulting elasticity effectively absorb shocks, allowing the nut and bolt to be effectively held in place without coming loose.

5. The first and second compression slots 14, 15 and connecting strips 16, 17 on the retaining nut 1 in this invention are arranged in alternating positions, resulting in the retaining nut 1 being able to hold objects in place with elastic force in any position.

6. The elastic force and positioning of the first and second compression slots 14, 15 are more easily felt when . fingers are used to twist the nut tight.

While the preferred embodiment of the invention has been described above, it will be recognized and understood that various modifications may be made therein and the appended claims are intended to cover all such modifications that may fall within the spirit and scope of the invention.

What is claimed is:

1. An elastic nut, comprising:
    screw threads on the inside of the main body of a retaining nut;
    a turning surface on the outside of the main body;
    a faying surface on the bottom of the main body of the nut; and
    a flange that extends below the turning surface, having first and second compression slots and connecting strips, with the upper and lower connecting strips being in alternate positions, wherein tightening the retaining nut compresses the compression slots causing the screw treads on the inside of the retaining nut to be pressed against the screw threads of a bolt thereby preventing loosening and the retaining nut exerts even elastic force on the faying surface.

2. An elastic nut as described in claim 1, wherein the turning surface of the retaining nut is knurled.

3. An elastic nut as described in claim 1, wherein the turning surface of the retaining nut can be in a hexagonal or non-hexagonal design.

\* \* \* \* \*